(12) United States Patent
Rudershausen

(10) Patent No.: US 8,737,193 B2
(45) Date of Patent: May 27, 2014

(54) CONVERTER FOR PERFECT DESPREADING OF ORTHOGONAL CDMA SEQUENCES

(76) Inventor: Reinhart Rudershausen, Schondorf am Ammersee (DE)

( * ) Notice: Subject to any disclaimer, the term of this patent is extended or adjusted under 35 U.S.C. 154(b) by 0 days.

(21) Appl. No.: 13/257,881

(22) PCT Filed: Mar. 16, 2010

(86) PCT No.: PCT/EP2010/053383
§ 371 (c)(1),
(2), (4) Date: Nov. 21, 2011

(87) PCT Pub. No.: WO2010/108823
PCT Pub. Date: Sep. 30, 2010

(65) Prior Publication Data
US 2012/0082024 A1    Apr. 5, 2012

(30) Foreign Application Priority Data
Mar. 23, 2009   (DE) .......................... 10 2009 014 480

(51) Int. Cl.
*H04L 12/26* (2006.01)
(52) U.S. Cl.
USPC .......................................... 370/209; 708/410
(58) Field of Classification Search
USPC ........... 370/208–210; 708/410, 420–426, 322
See application file for complete search history.

(56) References Cited

U.S. PATENT DOCUMENTS

| | | | |
|---|---|---|---|
| 6,567,482 B1 | 5/2003 | Popovic' | |
| 2006/0010188 A1* | 1/2006 | Solomon et al. | 708/400 |
| 2008/0147766 A1* | 6/2008 | Rudershausen | 708/426 |

FOREIGN PATENT DOCUMENTS

EP    1726114 A1    11/2006

OTHER PUBLICATIONS

International Search Report for PCT/EP2010/053383 issued by the ISA/European Patent Office dated Jun. 14, 2010.
Golay, M. "Complementary Series," IRE Transactions on Information Theory, IEEE, Apr. 1, 1961, pp. 82-87, vol. 1 No. 2., USA.

* cited by examiner

*Primary Examiner* — Gary Mui
(74) *Attorney, Agent, or Firm* — Kilpatrick Townsend & Stockton LLP

(57) ABSTRACT

The invention comprises a method for de-spreading of a data signal spread with a spread spectrum sequence. The invention is especially suited for the improvement of correlations of spread data signals after transmission. Therefor it can be integrated as software or hardware module into existing transmission systems. The method comprises the formation of a time-reversed spread data signal from the spread data signal, the formation of a sequence which arises through alternating multiplication of the chips of the spread data signal from the spread data signal, and the sequence of the time-reversed spread data signal, which arises from the time-reversed data signal through alternating multiplication of the chips by +1 and −1, the correlation of the spread data signal with the spread spectrum signal, of the time-reversed spread data signal with the time-reversed spread spectrum signal, of the spread data signal multiplied by the +1, −1 sequence with the spread spectrum sequence multiplied by the +1, −1 sequence and of the time-reversed spread data signal multiplied by the +1, −1 sequence with the time-reversed spread spectrum sequence multiplied by the +1, −1 sequence, and the summation of the four correlations.

15 Claims, 13 Drawing Sheets

|  | Time Axis (Shift in Amount of Sub-pulses τ) | | | | | | | | | | | | | | |
| --- | --- | --- | --- | --- | --- | --- | --- | --- | --- | --- | --- | --- | --- | --- | --- |
|  | $t_{15}$ | $t_{14}$ | $t_{13}$ | $t_{12}$ | $t_{11}$ | $t_{10}$ | $t_9$ | $t_8$ | $t_7$ | $t_6$ | $t_5$ | $t_4$ | $t_3$ | $t_2$ | $t_1$ |
| Correlation sums |  |  |  |  |  |  |  |  |  |  |  |  |  |  |  |
| AW(3,1) / AW(3,1) | 0 | 0 | 0 | 0 | 0 | 0 | 0 | 32 | 0 | 0 | 0 | 0 | 0 | 0 | 0 |
| AW(3,1) / AW(3,3) | 0 | 0 | 0 | 0 | 0 | 0 | 0 | 0 | 0 | 0 | 0 | 0 | 0 | 0 | 0 |
| AW(3,1) / AW(3,5) | 0 | 0 | 0 | 0 | 0 | 0 | 0 | 0 | 0 | 0 | 0 | 0 | 0 | 0 | 0 |
| AW(3,1) / AW(3,7) | 0 | 0 | 0 | 0 | 0 | 16 | 0 | 0 | 0 | 16 | 0 | 0 | 0 | 0 | 0 |
| AW(3,3) / AW(3,1) | 0 | 0 | 0 | 0 | 0 | 0 | 0 | 0 | 0 | 0 | 0 | 0 | 0 | 0 | 0 |
| AW(3,3) / AW(3,3) | 0 | 0 | 0 | 0 | 0 | 0 | 0 | 32 | 0 | 0 | 0 | 0 | 0 | 0 | 0 |
| AW(3,3) / AW(3,5) | 0 | 0 | 0 | 0 | 0 | -16 | 0 | 0 | 0 | -16 | 0 | 0 | 0 | 0 | 0 |
| AW(3,3) / AW(3,7) | 0 | 0 | 0 | 0 | 0 | 0 | 0 | 0 | 0 | 0 | 0 | 0 | 0 | 0 | 0 |
| AW(3,5) / AW(3,1) | 0 | 0 | 0 | 0 | 0 | 0 | 0 | 0 | 0 | 0 | 0 | 0 | 0 | 0 | 0 |
| AW(3,5) / AW(3,3) | 0 | 0 | 0 | 0 | 0 | -16 | 0 | 0 | 0 | -16 | 0 | 0 | 0 | 0 | 0 |
| AW(3,5) / AW(3,5) | 0 | 0 | 0 | 0 | 0 | 0 | 0 | 32 | 0 | 0 | 0 | 0 | 0 | 0 | 0 |
| AW(3,5) / AW(3,7) | 0 | 0 | 0 | 0 | 0 | 0 | 0 | 0 | 0 | 0 | 0 | 0 | 0 | 0 | 0 |
| AW(3,7) / AW(3,1) | 0 | 0 | 0 | 0 | 0 | 16 | 0 | 0 | 0 | 16 | 0 | 0 | 0 | 0 | 0 |
| AW(3,7) / AW(3,3) | 0 | 0 | 0 | 0 | 0 | 0 | 0 | 0 | 0 | 0 | 0 | 0 | 0 | 0 | 0 |
| AW(3,7) / AW(3,5) | 0 | 0 | 0 | 0 | 0 | 0 | 0 | 0 | 0 | 0 | 0 | 0 | 0 | 0 | 0 |
| AW(3,7) / AW(3,7) | 0 | 0 | 0 | 0 | 0 | 0 | 0 | 32 | 0 | 0 | 0 | 0 | 0 | 0 | 0 |

Fig. 5

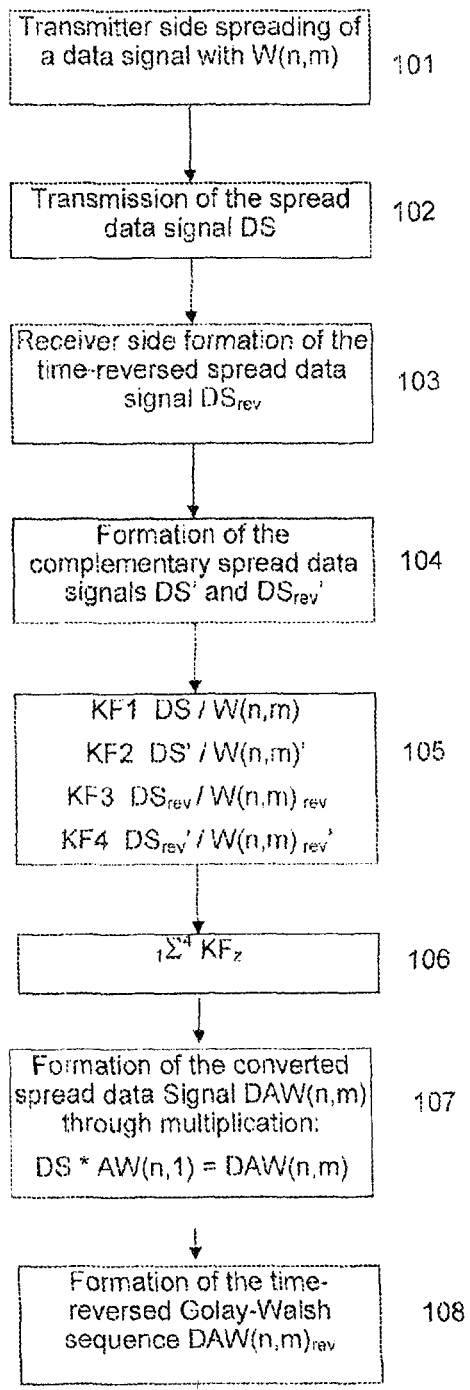
Fig. 10
(Continued on next page)

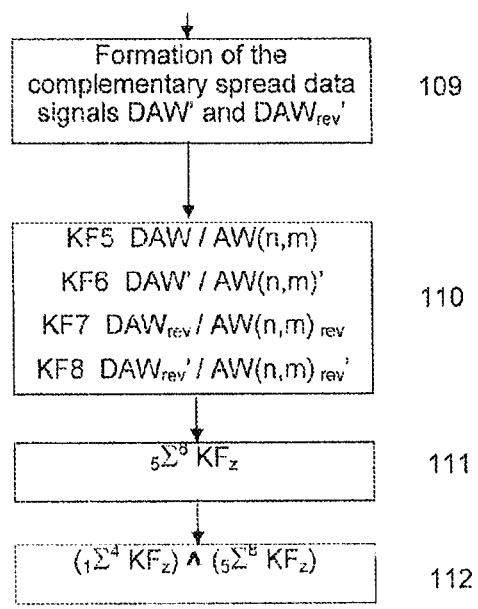
Fig. 10
(Continued from previous page)

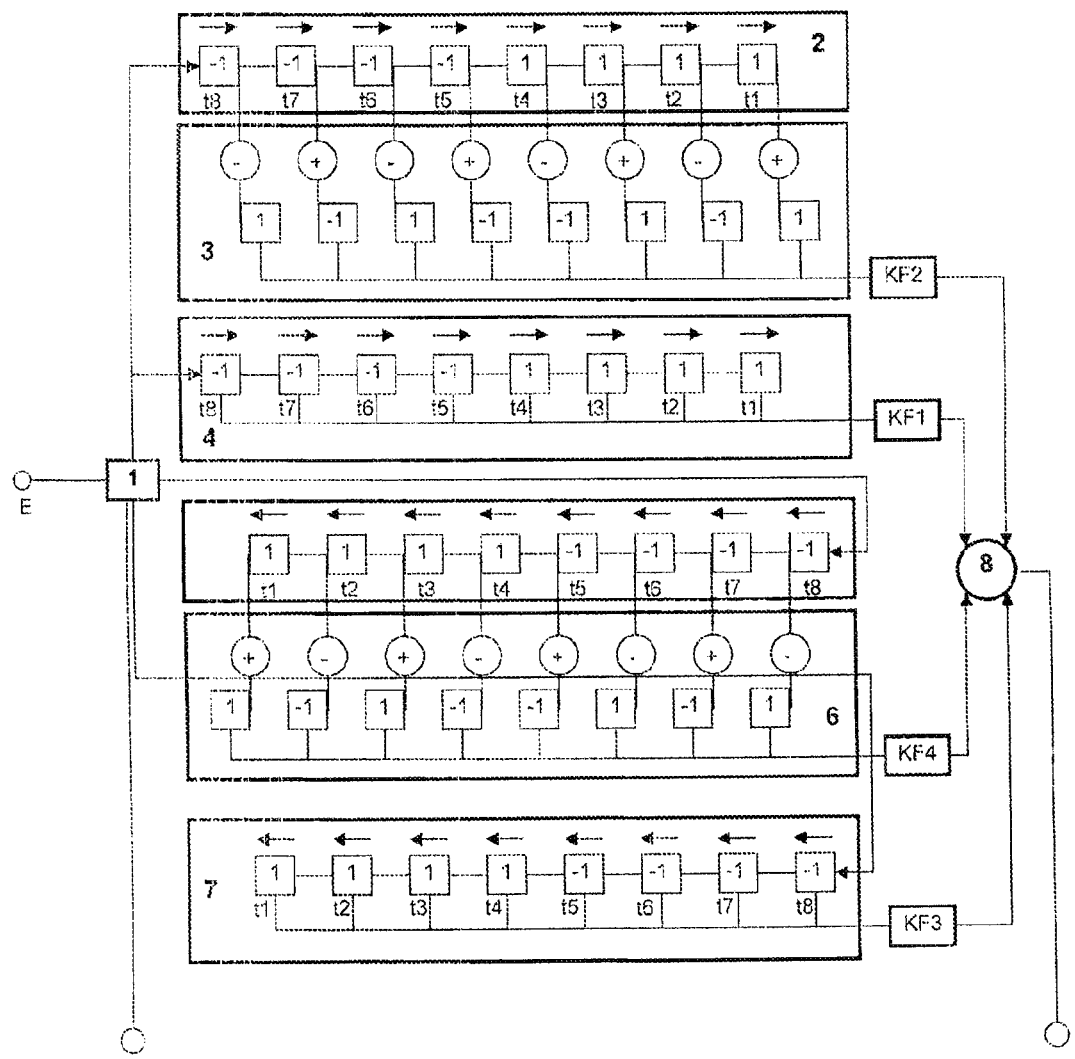
Fig. 11
(Continued on next page)

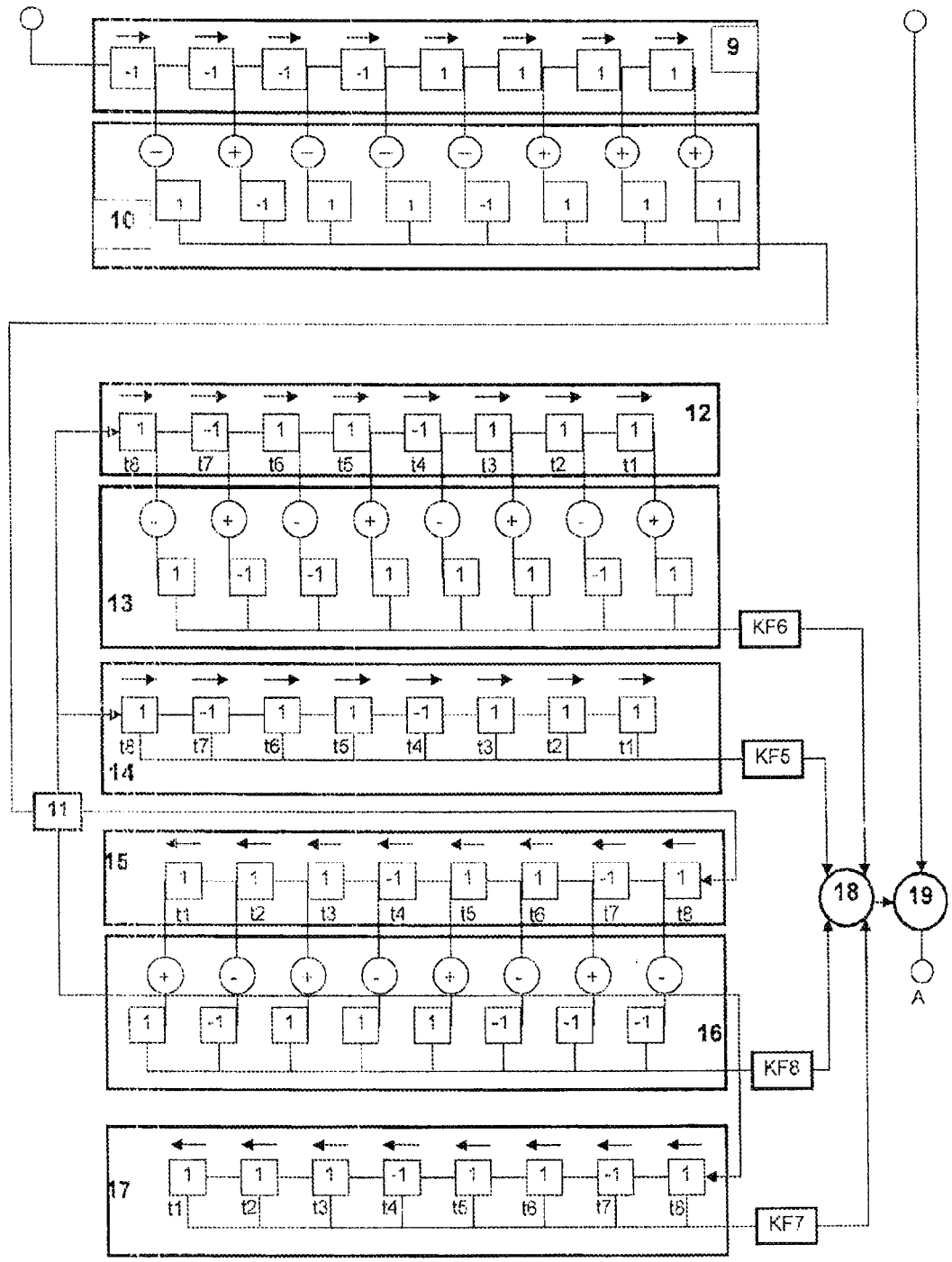
Fig. 11
(Continued from previous page)

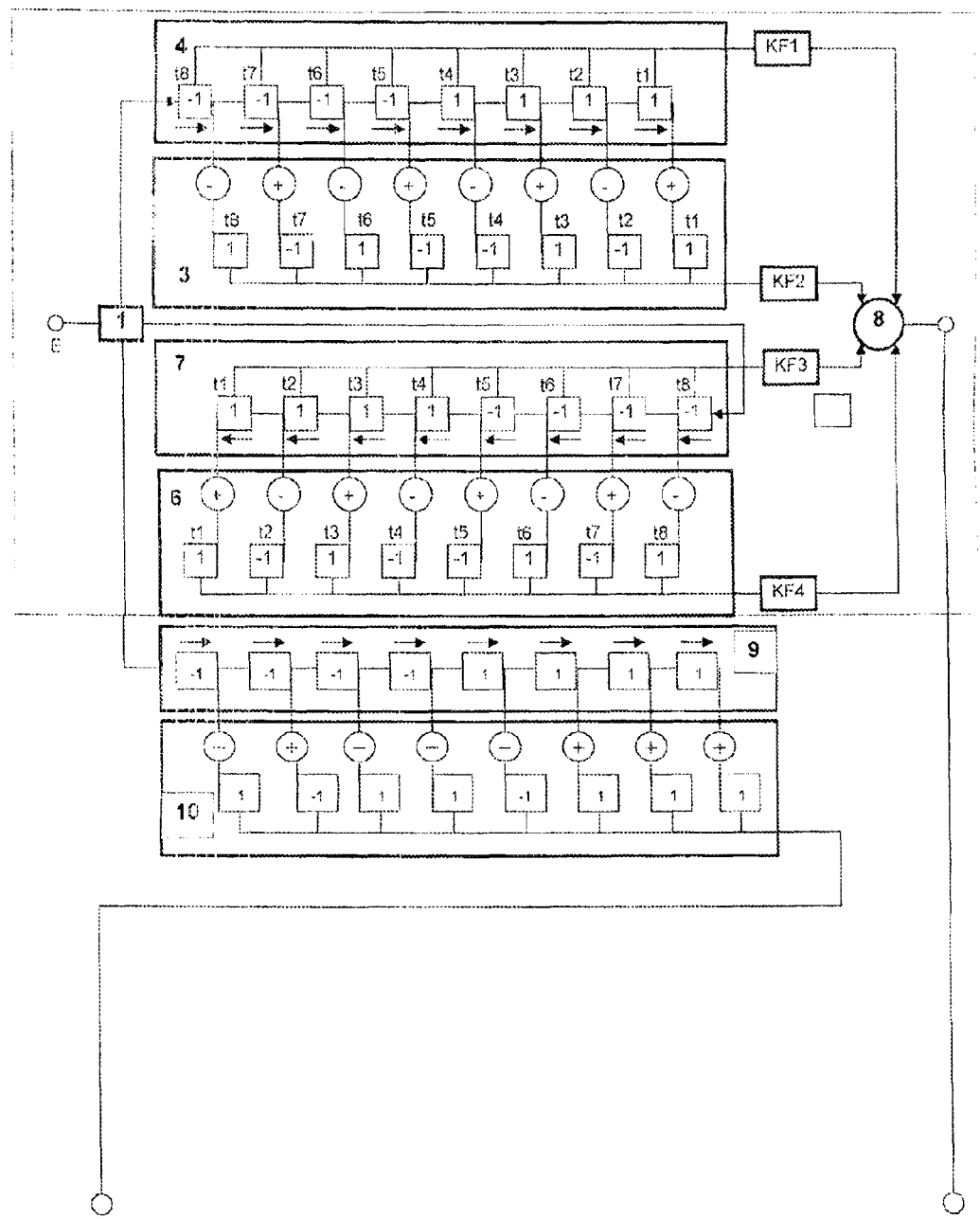
Fig. 12
(Continued on next page)

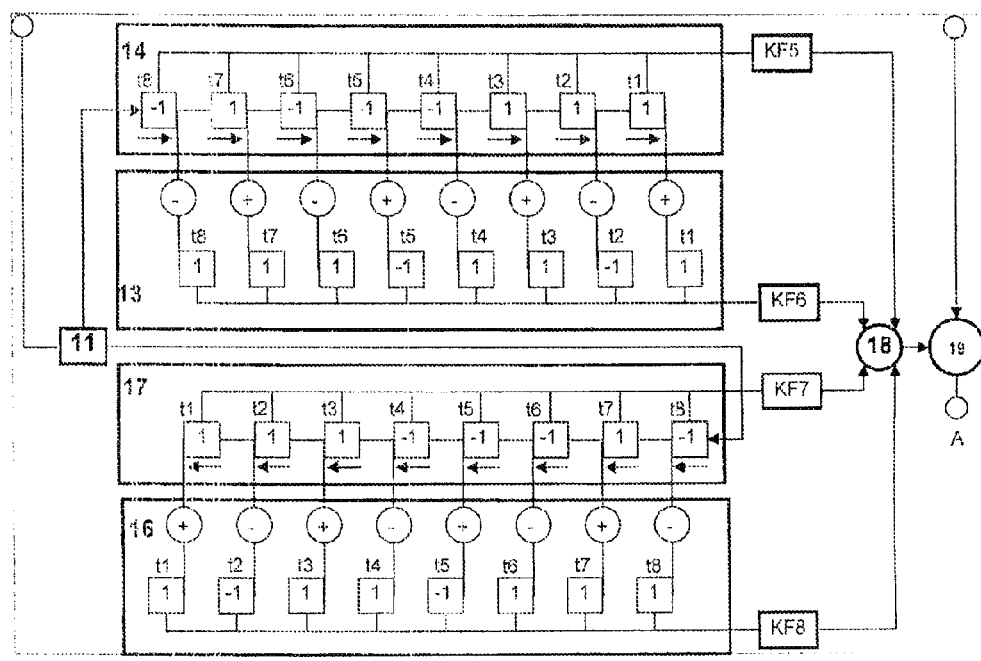
Fig. 12
(Continued from previous page)

CONVERTER FOR PERFECT DESPREADING OF ORTHOGONAL CDMA SEQUENCES

The present application is a U.S. National Stage Application of PCT/EP2010/053383, filed Mar. 16, 2010, which claims priority to German Patent Application No. 102009014480.3, filed on Mar. 23, 2009, the entire contents of which are incorporated by reference herein.

The invention comprises a method and a decoder for the de-spreading of a data signal spread with a Walsh sequence or a Golay-Walsh Sequence.

The invention comprises a method and a decoder for the de-spreading of a data signal which is spread with other spreading sequences.

With data transmission systems that utilize multiple access code division, as for example cdma2000, UMTS, GPS, RFID, WIFI and WiMAX, several subscribers are able to simultaneously transmit data via one transceiver channel. In order to avoid collisions, the transmitter spreads the data signals of each single subscriber with distinct spreading sequences (i.e. coding by a spread spectrum code, or rather by a code sequence), which enable the precise identification of a specific subscriber channel. By using the spread spectrum method for data signals, the entire system bandwidth can be utilized, i.e. the usable bandwidth for each single subscriber is increased within the frequency domain. Spreading factors between 10 and 1000 are applied in practical systems.

One advantage of this method is the low susceptibility against the effects of multipath propagation. Because of the high transmission bandwidth, only a small part of the occupied spectrum is influenced by the frequency-selective Rayleigh fading, such that the typical signal reductions are considerably less than within narrow band systems. Another advantage is the low amplitude of the power spectrum which is lowered by the spreading procedure. Hence, communication even below the noise level is enabled. Further advantages are the minor influence of jamming signals of different sources (anti-jamming), including intra channel interference (anti-interference) from other subscribers, and the effect of the spreading sequence as scrambling code since the message in the receiver can only be detected if the spreading code is known.

With the spread spectrum technique the data signal to be transmitted is spread over an enlarged spectrum area by a spreading sequence, e.g. a pseudo-noise sequence (PN-sequence). After modulation onto the radio frequency carrier, the data signal, now spread, is transmitted, e.g. emitted from an antenna. The receiver demodulates the spread data signal and then performs a de-spreading with a spreading signal which is synchronous to the transmitter.

The receiver does not only receive the spread data signal from the requested subscriber but also additional spread data signals from other subscribers, which transmit in the same frequency range. Through the de-spreading process in the receiver though, only that data signal, which uses the same and synchronous spreading sequence as the transmitter, is despread. After de-spreading, the requested data signal can be filtered out easily by means of a matched filter ("Matched Filter", refer to J. G. Proakis, M. Salehi, Grundlagen der Kommu-nikationstechnik, Pearson Studium, München, 2004, p. 793-797).

The filter for spreading sequences can be described by the auto- and cross-correlation function (AKF). This AKF can be formed for discrete functions through an autocorrelation sum ($AKF_k$) and represents the statistical relationship of the elements of a sequence $X_i$ (k) with N elements:

$$AKF_k = \sum_{i=0}^{N-1-k} X_i X_{i+k}$$

where the index k indicates the relative runtime shift of the spreading sequence between each other (shift in amounts of sub pulses $\tau$ when calculating the correlation; $0 \leq k \leq N-1$); only when k=0 does the autocorrelation result in a value unequal to zero—assuming ideal conditions without interferences and with synchronous reception—which then just corresponds directly to the data signal. Other values, so called sidelobes, then do not arise.

Spreading sequences exist with nearly ideal periodic AKFs, e.g. the m-sequences and Gold sequences.

However, the periodic autocorrelation property of a spreading sequence is not the only relevant attribute for the spread spectrum technique. For applications in Code Division Multiple Access systems (CDMA systems) the aperiodic properties for incoherent reception and the cross-correlation characteristics are also of great interest. The interference between two differently spread data signals is proportional to the scalar product of both spreading sequences. Hence spreading sequences should be at least orthogonal, which means that their scalar product is zero. However, orthogonality alone is not sufficient for applications where the spreading sequences are not synchronously transmitted or when large signal time delays arise from multipath propagation. In these cases the scalar product shifted by the delay $\tau$, i.e. the cross-correlation function (KKF), must also be minimized.

The KKF is therefore a measure for the applicability of different sequences $X_i(k)$ and $Y_i(k)$ in Code Division Multiple Access systems and can be built for discrete functions via the cross-correlation sum ($KKF_k$):

$$KKF_k = \sum_{i=0}^{N-1-k} X_i Y_{i+k}$$

The lower the cross-correlation values of the spreading sequences of different user signals are, the fewer the interferences and the more users that are able to participate in Code Division Multiple Access.

A lot of specific spreading sequences have been investigated in the past with particularly good cross-correlation properties. Examples are the Gold sequences (refer to Optimal Binary Sequences for Spread Spectrum Multiplexing, R. Gold, IEEE Transactions on Information Theory, Vol. IT-13, October 1967, S. 619-621).

The lowest cross-correlation values of Gold sequences, the best known spreading sequences, are limited to $1+2^{0.5*(z+1)}$, where z designates the amount of shift register steps, (refer to H. D. Lüke, "Korrelationssignale", Springer, 1992).

In multicarrier systems using the CDMA method, the high values of the cross-correlation reduce the signal to noise ratio in front of the decoder, which in turn limits the maximum amount of subscribers. In addition, if the amplitude of the spread data signal of the subscribers widely varies, the non-ideal cross-correlation properties of a spreading sequence can cause the requested signal to be covered in the receiver through the other spread data signals, and thus will not be detected (near-far effect).

DE 197 17 546 A1 discloses a method and an apparatus for decoding and for demodulating the received signal in a CDMA transmission system which is specified in serial code chaining. There, a two step coding on the transmitter side of the transmission system is comprised of external and internal coding. The internal coding is an orthogonal multi-step modulation with Walsh functions, whereas the external coding consists of an error correcting code.

A disadvantage by applying such a system for the transmission of spread data signals arises in the fact that, for error correction of the transmission, a second signal has to be transmitted. This reduces the available bandwidth and is arithmetically very sophisticated.

EP 1 311 095 B1 discloses the application of pairs of Golay sequences for spread spectrum modulation. Binary input data are spread with η pairs of complementary Golay sequences according to the described method, and these pairs are transmitted via an apparatus for digital communication. When being received, the so-created sequences are folded by correlation with the η pairs of complementary Golay sequences, while the results of the folding related corresponding to equal pairs of Golay sequences are added in order to get η data streams.

EP 1 726 114 B1 also discloses the application of pairs of Golay sequences for spread spectrum modulation. However, here only one of the Golay sequences of a pair has to be transmitted since the respective complementary sequence is generated on the receiver side.

Golay sequences are sequence pairs with the advantageous property that their phase-shifted aperiodic autocorrelation coefficients add up to zero. In this way the disturbing sidelobes in the autocorrelation function are avoided.

One disadvantage of the spread spectrum modulation with pure Golay sequences results from the fact that only a few pairs exist for a certain sequence length. Therefore, a multi-carrier transmission of many spread data signals is limited through the small size of the sequence family, which is required for spread spectrum coding. Furthermore, they do have orthogonal characteristic having a zero with shift $\tau=0$; however, with shifts $\tau>0$ the cross-correlation between different Golay sequences shows disturbing sidelobes.

To overcome this restriction, EP 1 726 114 B1 discloses the additional transition to complex-valued sequences with the application of DPSK (differential phase shift keying).

But this is very complex since, not only a second completely different modulation scheme with additional procedural steps is required, but also additional hardware components are necessary.

The purpose of this invention is to enable the downstream decoding of spread data signals through a method and an apparatus, which are transmitted with multiple other data signals on the same bandwidth of a data connection with simple technical means. This occurs without resulting in disturbing cross-talk or other diminishing factors on single data signals through the other data signals. At the same time, the method shall comply with existing standards in applying spread data signals.

This task is accomplished through the invention's method for de-spreading of a spread signal according to claim 1, a decoder for de-spreading of a spread data signal according to claim 10, and an apparatus for digital communication according to claim 15. Advantageous designs are subject to the dependant claims.

The method subject to the invention can be simply integrated as a software or hardware module into the existing transmission system.

The correlation properties of the transmitted spread signals are very much improved in accordance with the invention's method. The auto- as well as the cross-correlation summations of the spread spectrum data signals show zero sidelobes or at least fewer and lower sidelobes as without the method.

Without the invention's method some of the Gold sequences or Walsh sequences applied in CDMA systems as signature sequences produce a poor aperiodic AKF and high values of KKF; moreover, the orthogonality is already lost with small synchronization errors or errors through signal distortion or multipath propagation.

With asynchronous reception—i.e. in case of an unknown relative time shift between the different spread spectrum sequences—the method according to the invention detects the spread signal from noise substantially better and it can be filtered out more easily from noise or noise signals or intra channel interference. Therefore the new method can be applied not only to the downlink but also to the uplink of a mobile radio system, e.g. within UMTS which already applies Walsh- and OVFS (orthogonal variable frequency sequences) sequences, as an improvement on the receiver side, and increasing the practically achievable subscriber quantity per cell into the direction of the theoretical full system load—i.e. N subscribers simultaneously with N spread spectrum sequences.

The increase of the user quantity and/or the increase of the range or the decrease of the transmitter power is also enabled for synchronous detection within digital communication systems.

Improvements against cross-talk within frequency hopping result from the ideal correlation and orthogonality properties of the different spread spectrum sequences in accordance with the invention.

Furthermore, the invention's method simultaneously presents an improved possibility for the initial synchronization of the data transmission.

Also, the spread spectrum methods applied up to now transition to complex-valued sequences with the according additional expense can be avoided simply by taking advantage of the internal properties of orthogonal binary sequences, as for example Walsh sequences, or orthogonal Golay-Walsh sequences. Nevertheless, since the sequences remain binary, the well-known higher complex-valued modulation schemes, like for example ¼-QPSK, 8-phase shift keying can be used for the usual purposes of increasing the data rate.

The data signals are spread with Walsh functions in a preferred embodiment. Walsh functions have the advantage that they are strictly orthogonal. They will be designated as $W(n,m)$ in the following where n designates the order of the used Walsh function family (with $2^n$ elements designated as chips and $2^n$ different Walsh functions) and m designates the actual Walsh function of the family. They are applied in spread spectrum technique as signature sequences, as well as for the separation of user channels and for high-level orthogonal modulation. The high-level orthogonal modulation results in the advantages of increasing the usable data rate by the factor of n and having a lower bit error rate.

The data signals are spread with the new-found Golay-Walsh sequences as spread spectrum sequences in another embodiment.

Golay-Walsh sequences originate from the multiplication of a Golay sequence with a Walsh function.

These new-found spread spectrum sequences will be designated $AW(n,m)$, analogous to the Walsh functions $W(n,m)$.

The advantageous property of Golay Sequences is preserved in the new-found spread spectrum sequences since the Golay-Walsh sequences, according to Golay, are also complementary sequences (refer to M. J. E. Golay, Complementary Sequences, IRE Transactions on Information Theory, Bd. IT-7, S. 82-87, April 1961). Therefore, the Golay-Walsh sequences, in the same way as the original Golay sequences, show a perfect autocorrelation function (AKF) with only one value unequal to zero, hence an ideal reception impulse. Synchronization errors during the transmission have no negative effects through the summation of the complementary spread spectrum sequences. The sidelobes of the autocorrelation are still eliminated through the summation of the autocorrelation of complementary sequences.

Through the invention's method, the orthogonality is preserved within the new-found Golay-Walsh sequences. In this way, the cross-correlation functions (KKF) of the Golay-Walsh sequences show zero values or just minimum values. Hence, due to the invention's method, they are suitable such as the original Walsh sequences for both as signature sequences for channel separation as well as for orthogonal high-level modulation to increase the data rate and for the reduction of bit error rates.

The complementary spread data signal is merely generated in the receiver. The chips of a received sequence are alternately multiplied for this purpose with +1 and −1 (so-called weighting), either in serial manner at the signal's branching off, or parallel after storage of the received chips. Different from conventional code division multiple access methods, only one spread data signal of a pair of complementary spread data signals is transmitted, and on the available system bandwidth only half of the data has to be transmitted. This also reduces the sensitivity of the systems against disturbances of the transmitted data signal and opens up a margin for further data signals on the same frequency band.

In particular, the above-described advantages are predominant in CDMA systems. Here the application of the new-found method results in fast power control, simplified soft-handover at the cell limits and a frequency reuse factor of N=1 between neighbor cells, i.e. more subscriber capacity through usage of more than one frequency in each cell.

Walsh functions W(n,m) are used for spreading in another preferred embodiment of the invention, which in this case, correspond to the spread sequences S.

In the example of a Walsh function family of order 3, eight users can be perfectly separated since Walsh sequences are strictly orthogonal. Therefore Walsh sequences are suitable e.g. for the downlink of a mobile system as far as it is synchronous and there is no frequency selective channel. However, this synchronicity is not valid for the uplink of a code division multiple access system, since the signals of the locally-distributed users reach the base station with different delay times, such that—also under non-selective channels—the orthogonal property of the Walsh sequences gets lost.

The majority of the values of the cross-correlated pairs are in the range of PN sequences. The values of the pairs W(3,3)/W(3,6) and W(3,4)/W(3,5) are extremely bad. The maximum of the KKF in the latter case reaches nearly the maximum value of the AKF with N−1=7 with a minor shift of τ; with that, no safe user separation can be achieved under asynchronous circumstances. The widths of the AKF in the cases of the codes W(3,1) and W(3,8) are also unfavorable, whereby no suppression of neighboring channel echoes is possible within frequency-selective channels. The AKF and KKF values of higher order Walsh sequences with sequence length 32 or higher are similarly unsatisfactory.

Therefore under frequency-selective conditions, the Walsh functions cannot be used as single user codes in the downlink; in addition, the code division multiple access signals are multiplied by a PN code to suppress the co-channel crosstalk. With that, the gradual diminishing of the quality (graceful degradation) is perceived only as noise during increasing multiple-user interference.

The new-found method can be taken as a remedial measure for the Walsh functions' problems.

In yet another preferred embodiment of the invention, the spread spectrum sequences S are orthogonal Golay-Walsh sequences, which have improved properties in comparison with the Walsh functions described as follows.

For the illustration of the formation of Golay-Walsh sequences, the following pair of complementary Golay sequences of length 8 is used, e.g. with eight chips:

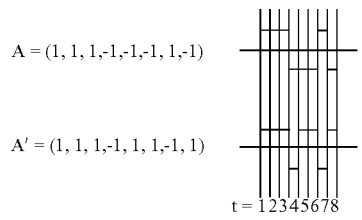

$A = (1, 1, 1, -1, -1, -1, 1, -1)$ $A' = (1, 1, 1, -1, 1, 1, -1, 1)$ $t = 1\ 2\ 3\ 4\ 5\ 6\ 7\ 8$ whereby t designates the point of time at which the respective chip arrives at a decoder.

Of course, Golay sequences of every other length that are suited for combination with Walsh functions can be used, particularly those with the same chip length.

The Golay Sequence A is multiplied with the even Walsh function of order 3-W(3,m)—resulting in the Golay-Walsh sequences AW(3,m). Exemplary is the formation of AW(3,1), AW(3,3), AW(3,5) and AW(3,7). These are depicted in the following table I with two phase steps at 0° and 180°, whereby these consist of eight sub-pulses that correspond to the chips:

TABLE 1

| | | | | | | | | | |
|---|---|---|---|---|---|---|---|---|---|
| W(3,1) | 1 | 1 | 1 | 1 | 1 | 1 | 1 | 1 | W(3, 1) |
| AW(3,1) | 1 | 1 | 1 | −1 | −1 | −1 | 1 | −1 | AW(3,1) |
| W(3,3) | 1 | 1 | −1 | −1 | −1 | −1 | 1 | 1 | W(3, 3) |
| AW(3,3) | 1 | 1 | −1 | 1 | 1 | 1 | 1 | −1 | AW(3,3) |
| W(3,5) | 1 | −1 | −1 | 1 | 1 | −1 | −1 | 1 | W(3, 5) |
| AW(3,5) | 1 | −1 | −1 | −1 | −1 | 1 | −1 | −1 | AW(3,5) |
| W(3,7) | 1 | −1 | 1 | −1 | −1 | 1 | −1 | 1 | W(3, 7) |
| AW(3,7) | 1 | −1 | 1 | 1 | 1 | −1 | −1 | −1 | AW (3,7) |

The families suitable for a code multiplex system, the orthogonal Walsh- and Golay-Walsh sequences, have the size of N, such that N spread data signals can be transmitted in one frequency band.

In another preferred embodiment, the method comprises the following steps for the formation of a converted spread data signal through: the multiplication of the spread Walsh signal with a Golay sequence, the formation of the time-reversed converted spread signal, the formation of the +1, −1 weighted (complementary) converted spread data signal out of the spread converted data signal and the weighted (complementary) time-reversed converted data signal out of the time-reversed converted data signal through multiplication of the chip sequence with −1 and −1 (called weighting), the correlation of the converted data signals with the time-reversed converted signal with a Golay-Walsh sequence, the time-reversed converted spread data signal with the time-reversed Golay-Walsh sequence, the complementary converted Golay-Walsh sequence and the complementary time-reversed converted spread data signal with the complementary time-reversed Golay-Walsh sequence, the summation of these four correlations, and the connection of the two formed sums through an AND operation.

Sidelobes still existing at some shifts τ>0 are completely removed through this embodiment, both in the AKF as well as simultaneously in all KKFs of the Walsh sequences or Golay-Walsh sequences.

This method's embodiment therefore has the advantage that the correlation properties of transmitted spread data signals are improved up to the perfect optimum. Both the sums of the autocorrelation as well as those of the cross-correlation functions of the invention's de-spread data signals show absolutely no sidelobes different from zero, in contrast to applications without this method.

Without this invention's method, some of the signature sequences in code division multiplex access systems used so far, like for example Gold sequences and Walsh sequences, show imperfect aperiodic AKF values and high values for the KKF; moreover, the orthogonality gets lost even with small synchronization errors or errors through signal distortion or multipath propagation. The diagrams in FIGS. 8 and 9 depict the improvement possibilities of this invention in multiples compared to Walsh sequences and Gold sequences, respectively, used so far:

FIG. 8 presents the multiples of the improvement of the main to sidelobes ratios of the AKF and KKF in comparison to Walsh sequences.

FIG. 9 presents the multiples of the improvement of the main to secondary sidelobes ratios of the KKF and aperiodic AKF compared to Gold sequences.

Through this embodiment the spread signal can be best differentiated from noise and it can be filtered out in an optimum manner from interfering signals or co-channel interferences.

In an asynchronous CDMA system, an available useful signal with the amplitude N adds to the N−1 users in terms of power at the input of the decisional stage—given the power control as precondition. According to the new invention's method, the signal to interference ratio results in $N^2/(N-1)$ ~N. That is, with a sequence length of N=64 one already achieves 18 dB—for bipolar transmission 13 dB would already be enough—up to 30 dB with sequence length of 1024. These are values which could not be achieved with current sequences (refer to the two diagrams FIGS. 8 and 9). Gold sequences with N=1024 have achieved around 3 dB in asynchronous operation so far. In other words, synchronization is no longer a necessary precondition as for CDMA systems so far with their Walsh or Gold sequences, and the subscriber quantity will not be reduced through cross-talk of other subscribers.

Examples of invention's embodiments of the invention will now be described in more detail.

FIG. 1 shows a flow diagram whereby a method for the de-spreading of a spread data signal according to the first embodiment of the invention is depicted.

FIG. 2 schematically shows a first realization of an apparatus for performing the method of the first embodiment according to FIG. 1.

FIG. 3 schematically shows a second realization of an apparatus for performing the method of the first embodiment according to FIG. 1.

FIG. 4 shows a graphical depiction of the sums of the cross-correlation sums KF AW(3,5)/AW(3,3) and KF AW(3, 5)/AW(3,5)', without the addition of the time-reversed spread data signals from the method's first embodiment in FIG. 1.

FIG. 5 shows a tabular depiction of the sum of the autocorrelation sums KKF1 to KKF4 of AW(3,1) and the cross-correlation sums KKF1 to KKF4 between AW(3,1) and respectively AW(3,3), AW(3,5) and AW(3,7) from the method's first embodiment in FIG. 1. By means of FIG. 1 now the method according to one of the embodiments will be described. First in step 101 the data signal to be transmitted is spread with a spread spectrum sequence, e.g. with a PN sequence, a Gold sequence, a Walsh sequence or a Golay-Walsh sequence. One bit of the data signal is coded with a spread spectrum sequence S such that a spread data signal DS is generated with the quantity of chips corresponding to the applied spread spectrum sequence S.

Figure 8:
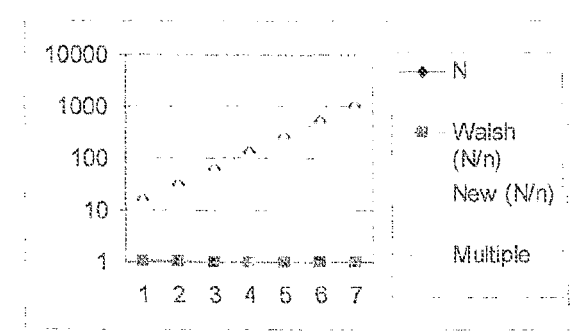

FIG. 8 presents the multiples of the main to secondary ratio of AKF and KKF in comparison to the Walsh sequences according to a second embodiment of the invention's method.

Figure 9:
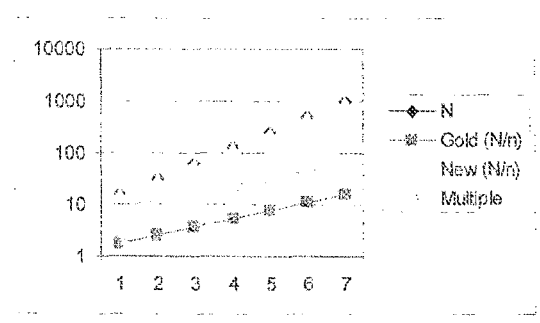

FIG. 9 presents the multiples of the main to secondary ratio of KKF and aperiodic AKF compared to Gold sequences according to a second embodiment of the invention's method.

FIG. 10 shows a flow diagram in which a method for the de-spreading of a spread data signal is depicted according to the second embodiment of the invention.

FIG. 11 schematically shows a first realization of an apparatus for performing the method of the second embodiment according to FIG. 10.

FIG. 12 schematically shows a second realization of an apparatus for performing the method of the second embodiment according to FIG. 10.

Figure 13:
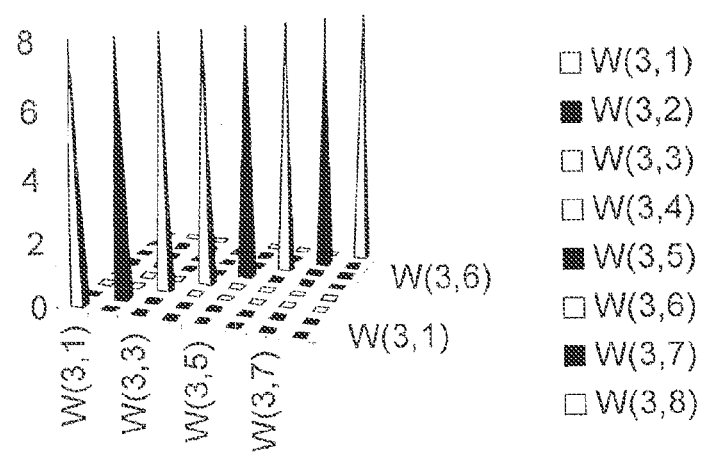

FIG. 13 summarizes the complete result of the new-found method of AKF and KKF for the example of Walsh sequences W(3,m).

The first embodiment of the method as well as their realizations will be explained by means of FIGS. 1 to 8 as follows:

For the transmission of data signals from multiple subscribers within a frequency band, each spread spectrum sequence S is multiplied within a coder with the data signal of the corresponding subscriber, i.e. coded. Since these spread data signals DS are orthogonal to each other, the data signals of different subscribers can be reconstructed later within the receiver, almost without disturbances.

Afterwards, the spread data signals DS are A/D-converted and transmitted in step 102, e.g. via a radio network in a CDMA mobile radio system or via a fiberglass cable in a backbone network.

Figure 1:
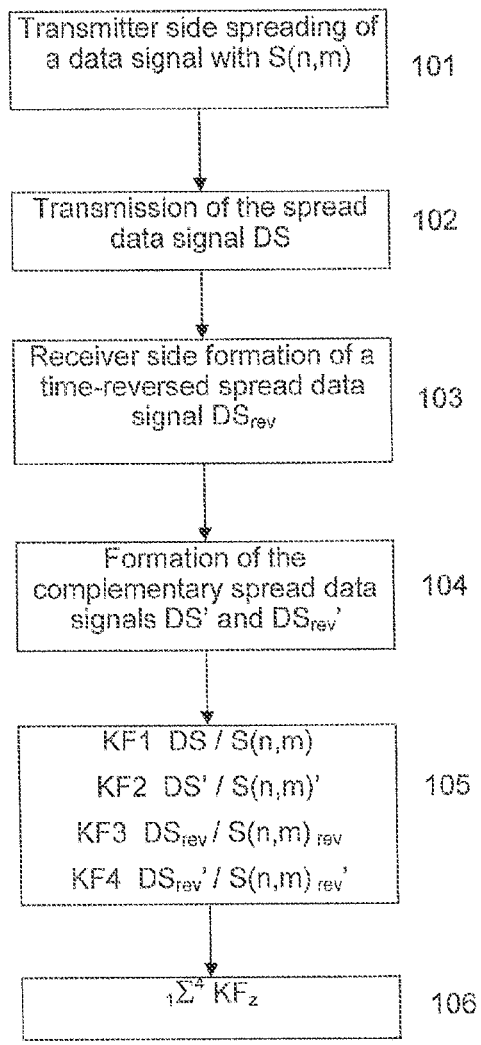
Figure 2:
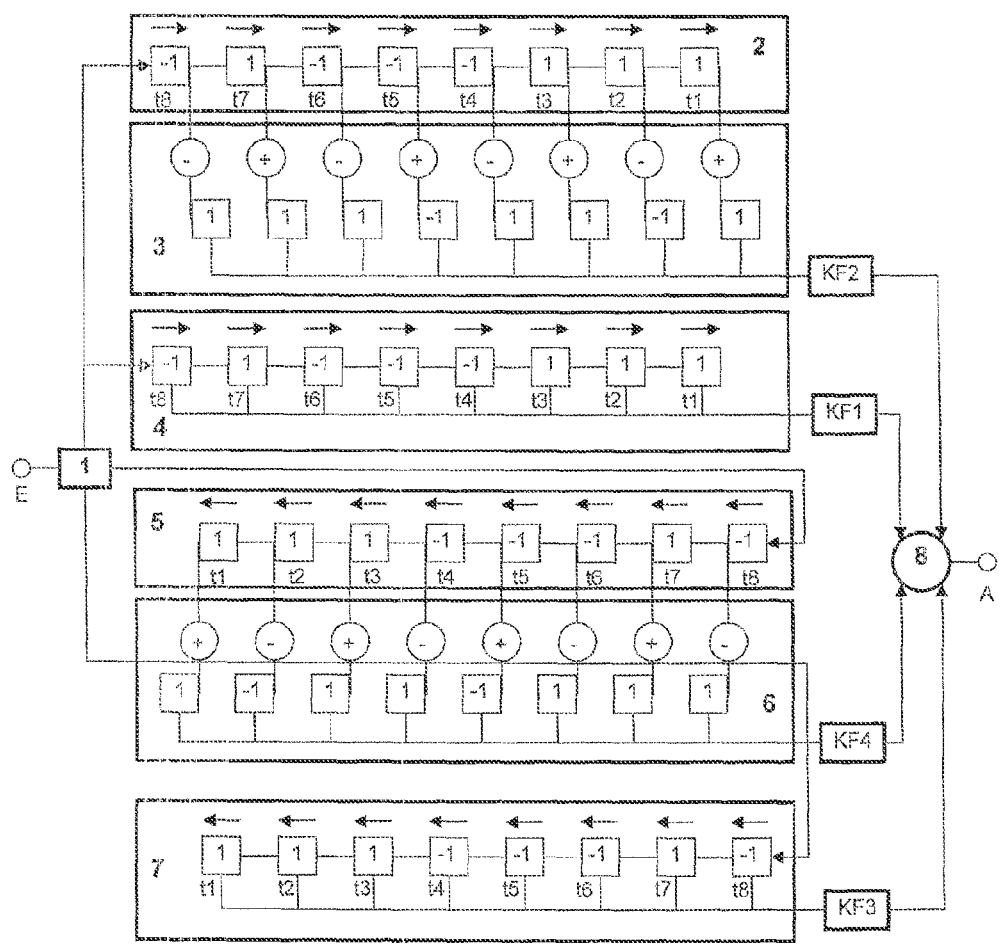
Figure 3:
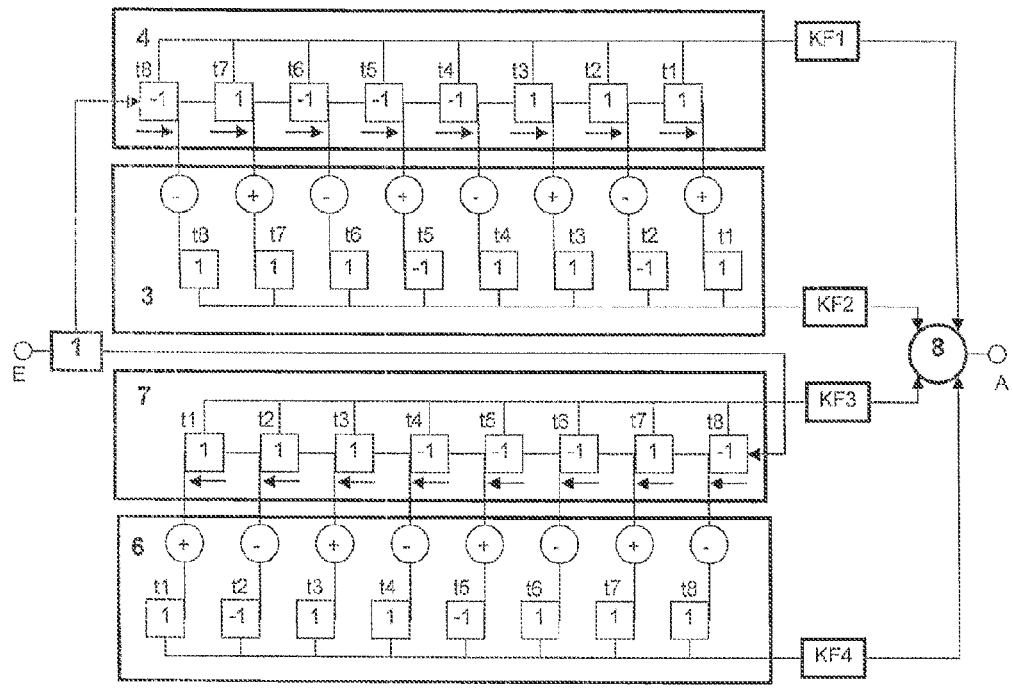

After the transmission of the spread data signal DS in step 102, it will be digitized according to steps 103 to 106 and decoded. For that, the decoder for the de-spreading of the spread data signal DS can be applied (to be described later); two exemplary realizations herefrom are depicted in FIGS. 2 and 3 with the chip length of 8 for the spread spectrum sequences.

First in step 103, a time-reversed spread data signal $DS_{rev}$, e.g. spread by a Walsh sequence is established from the received data signal DS. For that, the received chips of the spread data signal DS are saved in reverse order.

Then in step 104, the respective complementary spread data signals DS', $DS_{rev}$' are formed from these two spread data signals DS, $DS_{rev}$.

This is accomplished through the serial or parallel alternating multiplication of the respective data signals with +1 and −1, as for example depicted in the following table for the Golay-Walsh sequence AW(3,7):

TABLE 2

| AW(3,7)     | 1 | −1 | 1 | 1  | 1 | −1 | −1 | −1 |
|-------------|---|----|---|----|---|----|----|----|
| Alternation | 1 | −1 | 1 | −1 | 1 | −1 | 1  | −1 |
| AW(3,7)'    | 1 | 1  | 1 | −1 | 1 | 1  | −1 | 1  |

Steps 103 and 104 can also be performed in reverse order.

The four spread data signals DS, $DS_{rev}$, DS', $DS_{rev}$' are then correlated within the receiver for the corresponding subscriber with the spread spectrum sequence S and their respective derivates S', $S_{rev}$, or $S_{rev}$' according to the invention, in order to filter out the original spread data signal out of the multiple of received spread data signals of other subscribers, which are modulated onto the frequency band.

It shall be observed that autocorrelations and cross-correlations respectively are formed between the spread data signal DS and the spread spectrum sequence S, between the time-reversed data signal $DS_{Rev}$ and the time-reversed spread spectrum sequence $S_{Rev}$, between the complementary spread data signal DS' and the complementary spread spectrum sequence S' and between the complementary time-reversed data signal $DS_{Rev}$' with the complementary time-reversed spread spectrum sequence $S_{Rev}$', whereby the already described auto- and cross-correlation sums are used:

$$AKF_k = \sum_{i=0}^{N-k-1} X_i X_{i+k} \text{ respectively. } KKF_k = \sum_{i=0}^{N-k-1} X_i Y_{i+k}$$

Hereby N symbolizes the number of chips in a sequence, i designates each chip in a sequence and k is the runtime shift of the sequence when calculating each single correlation function $KKF_k$ (shift in number of sub-pulses τ).

The following tables 3, 4, 5 and 6 show the different cross-correlation functions as designated above for the Golay-Walsh sequences AW(3,7) and AW(3,1) as examples. Each column corresponds to a runtime to which the signals arrived at each other. Within this example it is assumed that the Golay-Walsh sequence AW(3,1) and their derivates are saved in the apparatus for the calculation of the correlations.

TABLE 3

|        |    |    |    |    |    |    |    |    |    | AW(3,7) |    |    |    |    |    |    |
|--------|----|----|----|----|----|----|----|----|----|---------|----|----|----|----|----|----|
| AW(3,1) | 1 |   |   |   |   |   |   |   | 1 | −1 | 1 | 1 | 1 | −1 | −1 | −1 |
|        | 1  |   |   |   |   |   |   | 1 | −1 | 1 | 1 | 1 | −1 | −1 | −1 |   |
|        | 1  |   |   |   |   |   | 1 | −1 | 1 | 1 | 1 | −1 | −1 | −1 |   |   |
|        | −1 |   |   |   |   | −1 | 1 | −1 | −1 | −1 | 1 | 1 | 1 |   |   |   |
|        | −1 |   |   |   | −1 | 1 | −1 | −1 | −1 | 1 | 1 | 1 |   |   |   |   |
|        | −1 |   |   | −1 | 1 | −1 | −1 | −1 | 1 | 1 | 1 |   |   |   |   |   |
|        | 1  |   | 1 | −1 | 1 | 1 | 1 | −1 | −1 | −1 |   |   |   |   |   |   |
|        | −1 | −1 | 1 | −1 | −1 | −1 | 1 | 1 | 1 |   |   |   |   |   |   |   |
| KKF1   |    | −1 | 2 | −3 | 0 | −1 | 2 | −3 | 0 | 1 | 6 | 3 | 0 | −3 | −2 | −1 |
|        |    | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ |

TABLE 4

|        |   |   |   |   |   |   |   |   |    | AW(3,7)' |    |    |    |    |    |   |
|--------|---|---|---|---|---|---|---|---|----|----------|----|----|----|----|----|---|
| AW(3,1)' | 1 |   |   |   |   |   |   |   | 1 | 1 | 1 | −1 | 1 | 1 | −1 | 1 |
|        | −1 |   |   |   |   |   |   | −1 | −1 | −1 | 1 | −1 | −1 | 1 | −1 |   |
|        | 1  |   |   |   |   |   | 1 | 1 | 1 | −1 | 1 | 1 | −1 | 1 |   |   |
|        | 1  |   |   |   |   | 1 | 1 | 1 | −1 | 1 | 1 | −1 | 1 |   |   |   |
|        | −1 |   |   |   | −1 | −1 | −1 | 1 | −1 | −1 | 1 | −1 |   |   |   |   |
|        | 1  |   |   | 1 | 1 | 1 | −1 | 1 | 1 | −1 | 1 |   |   |   |   |   |
|        | 1  |   | 1 | 1 | 1 | −1 | 1 | 1 | −1 | 1 |   |   |   |   |   |   |
|        | 1  | 1 | 1 | 1 | −1 | 1 | 1 | −1 | 1 |   |   |   |   |   |   |   |
| KKF2   |    | 1 | 2 | 3 | 0 | 1 | 2 | 3 | 0 | −1 | 6 | −3 | 0 | 3 | −2 | 1 |
|        |    | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ |

TABLE 5

|             |    |   |   |   |   |   |   |   | $AW(3,7)_{Rev}$ |    |    |    |    |    |   |    |
|-------------|----|---|---|---|---|---|---|---|-----------------|----|----|----|----|----|---|----|
| $AW(3,1)_{Rev}$ | −1 |   |   |   |   |   |   |   | 1 | 1 | 1 | −1 | −1 | −1 | 1 | −1 |
|             | 1  |   |   |   |   |   |   | −1 | −1 | −1 | 1 | 1 | 1 | −1 | 1 |    |
|             | −1 |   |   |   |   |   | 1 | 1 | 1 | −1 | −1 | −1 | 1 | −1 |   |    |

TABLE 5-continued

| | | | | | | | | AW(3,7)$_{Rev}$ | | | | | | | |
|---|---|---|---|---|---|---|---|---|---|---|---|---|---|---|---|
| | −1 | | | | 1 | 1 | 1 | −1 | −1 | −1 | 1 | −1 | | | |
| | −1 | | | 1 | 1 | 1 | −1 | −1 | −1 | 1 | −1 | | | | |
| | 1 | | −1 | −1 | −1 | 1 | 1 | 1 | −1 | 1 | | | | | |
| | 1 | −1 | −1 | −1 | 1 | 1 | 1 | −1 | 1 | | | | | | |
| | 1 | −1 | −1 | −1 | 1 | 1 | 1 | −1 | 1 | | | | | | |
| KKF3 | | −1 | −2 | −3 | 0 | 3 | 6 | 1 | 0 | −3 | 2 | −1 | 0 | −3 | 2 | −1 |
| | | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ |

TABLE 6

| | | | | | | | | AW(3,7)$_{Rev}$' | | | | | | | |
|---|---|---|---|---|---|---|---|---|---|---|---|---|---|---|---|
| AW(3,1)$_{Rev}$' | −1 | | | | | | | 1 | −1 | 1 | 1 | −1 | 1 | 1 | 1 |
| | −1 | | | | | | 1 | −1 | 1 | 1 | −1 | 1 | 1 | 1 | |
| | −1 | | | | | 1 | −1 | 1 | 1 | −1 | 1 | 1 | 1 | | |
| | 1 | | | | −1 | 1 | −1 | −1 | 1 | −1 | −1 | −1 | | | |
| | −1 | | | 1 | −1 | 1 | 1 | −1 | 1 | 1 | 1 | | | | |
| | −1 | | 1 | −1 | 1 | 1 | −1 | 1 | 1 | 1 | | | | | |
| | 1 | −1 | 1 | −1 | −1 | 1 | −1 | −1 | −1 | | | | | | |
| | −1 | 1 | −1 | 1 | 1 | −1 | 1 | 1 | 1 | | | | | | |
| KKF4 | | 1 | −2 | 3 | 0 | −3 | 6 | −1 | 0 | 3 | 2 | 1 | 0 | 3 | 2 | 1 |
| | | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ |

Eventually in step 106, the summation is formed over the four cross-correlation sums from the example out of tables 3 through 6 (refer to table 7):

TABLE 7

| | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ |
|---|---|---|---|---|---|---|---|---|---|---|---|---|---|---|---|
| Σ KKF1 − KKF4 | 0 | 0 | 0 | 0 | 0 | 16 | 0 | 0 | 0 | 16 | 0 | 0 | 0 | 0 | 0 |

In case the spread data signal AW(3,3) or AW(3,5) arrives in the decoder with the saved Golay-Walsh sequence AW(3, 1), then the corresponding sums of the cross-correlations calculated according to the tables 3 through 7 result in a zero value for all runtime shifts.

The autocorrelations result in a corresponding way if the received spread data signal DS has been spread with the same spread spectrum sequence S as saved in the decoder:

Σ*AKF*1–*AKF*4

The autocorrelation functions AKF1 are formed analogously to the above presented cross-correlations:

AKF1=correlation of the spread data signal DS with the saved spread spectrum sequence S.

AKF2=correlation of the spread data signal DS' with the saved spread spectrum sequence S'.

AKF3=correlation of the spread data signal DS$_{Rev}$ with the saved spread spectrum sequence S$_{Rev}$.

AKF4=correlation of the spread data signal DS$_{Rev}$' with the saved spread spectrum sequence S$_{Rev}$'.

The AKF and KKF properties of the Walsh sequences are substantially improved by means of the invention's method. After execution of the steps designated below demonstrates the result demonstrates following example of the first eight correlations in FIG. 6.

In contrary to the Walsh sequences without the invention's method, the prevailing part of the sidelobes has disappeared. Only three pairs, W(3,1)/W(3,3) (refer to FIG. 6), W(3,2)/W (3,4) and W(3,5)/W(3,7), of the 27 possibilities of cross-correlations altogether show small sidelobes. Even the auto-correlation sums of triangular, wide shape, not suitable for synchronization, are improved and have an advantageous minimum other than the main data signal peak which helps to control small time shifts.

Hence on each side of the main maximum of the AKF there is a minimum with a zero or rather a −1, such that a runtime shift of τ can even be compensated in case of infringements of the main maximum. Also, four of the seven KKFs have no values different from zero.

If the spreading is accomplished with Golay-Walsh sequences AW(n,m), its AKF and KKF subject to the invention's method are also substantially improved. These have the following internal symmetrical property that is used for the ideal pulse compression with low sidelobes: with the summation above, the sums of the AKF result in zero for all sidelobes values as can be seen in the table in FIG. 5; graphically shown in FIG. 7. This is a great advantage in comparison to the AKF for a transmission of the data signal without the invention's method.

Figure 7:
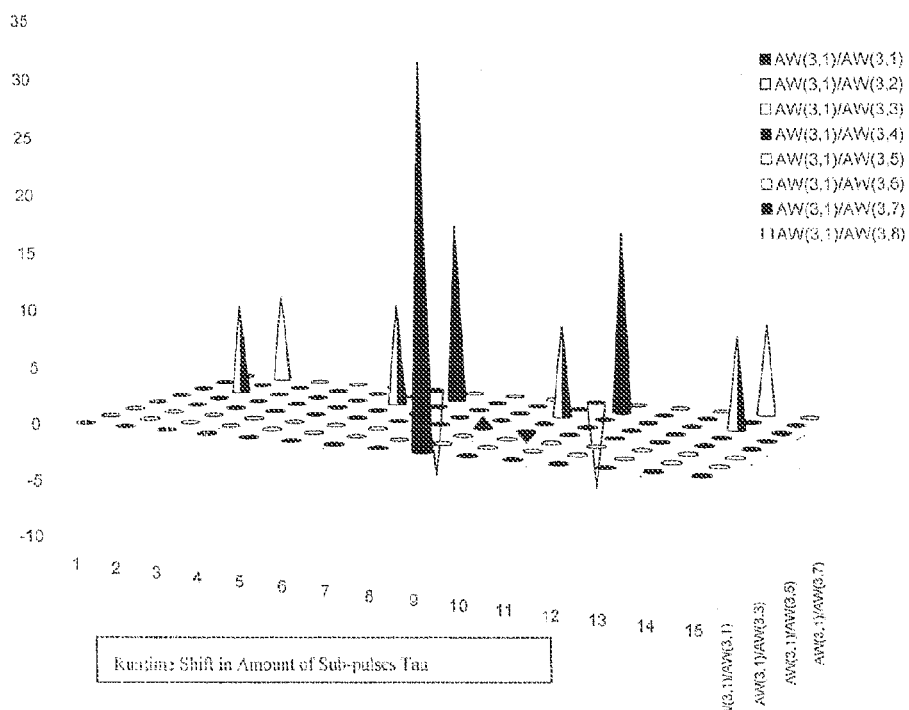
FIG. 7 depicts the correlations of Golay-Walsh sequences of order three in a diagram after execution of the method's steps according to the first embodiment.

In addition, the KKFs between the data signals spread with the invention's spread spectrum modulation method have at most only four small values compared to the AKF, which in the exemplary values for the Golay-Walsh sequences with eight chips, only arise only for three out of seven further used sequences, in the case of AW(3,1) for AW(3,6), AW(3,7) and AW(3,8), (refer to FIG. 5 and FIG. 7).

FIG. 5 will be further explained in the following. The four rows of the first group correspond to the case that the Golay-Walsh sequence AW(3,1) and its derivates are saved in the invention's receiver. If a spread data signal AW(3,1) arrives in this receiver, the correlation (first row in the first group of FIG. 5) thus results in only one single output pulse with an amplitude of 32 in column $t_8$, in which both sequences have no shift against each other ($\tau=8$ or index k=0). This corresponds to the case of autocorrelation.

However, if a spread sequence AW(3,3) in the receiver arrives with the saved sequence AW(3,1), the correlation of these two sequences results in zero across the table according to the second row of the first group of table entries.

In case a spread signal AW(3,5) arrives, then the zero value appears everywhere also in the third row.

If a spread signal AW(3,7) arrives, then an output value of 16 arises, corresponding to the fourth row in columns $t_6$ and $t_{10}$. However, this correlation value between the spread signals AW (3,1) and AW(3,7) is so far away from the value of 32 from the autocorrelation of the signal AW(3,1), that it guarantees an unambiguous detection of the requested signal.

The three groups in FIG. 5 correspond to the cases when the receiver has saved AW(3,3), AW(3,5) and AW(3,7) respectively and its derivates. In all cases, there is a wide distance between the respective useful signal with the value 32 and the interfering signals with values +/−16.

Figure 4:
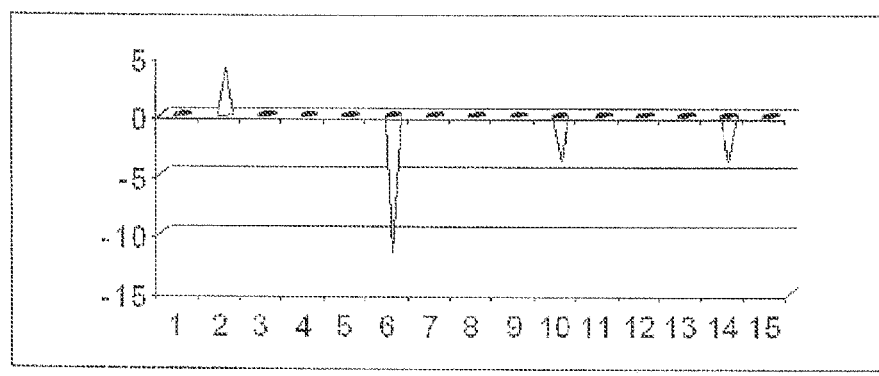

If the invention's method was carried out without the time-reversal step 103 and the summation of the correlations calculated in this way, then more values of the KKF would be unequal to zero and the amounts would be larger. FIG. 4 shows the result of the direct KKF without time reversal between the Golay-Walsh sequence exemplary AW(3,5) and AW (3,3). Evidently, four interfering peaks arise that would lead to interference during decoding.

Some or all of the stated method steps and perhaps additional steps can be surely performed in the frequency domain.

A decoder will be described in the following for the realization of the method on the receiver side, which is depicted in two different embodiments in the FIGS. 2 and 3.

The receiver receives spread data signals DS that are first e.g. smoothened by a sub-pulse filter and converted from analog to digital. Then these are applied to the input E of the decoder. The envelope of the spread data signal DS after a sub-pulse filter and A/D converter will be passed on as a positive or negative digital number, here symbolized as +1, and −1 respectively, depending on the phase displacement 0 or 180 degrees. Within these embodiments, the spread data signals DS are binary data sequences of length 8, with eight chips, which have been spread with spread spectrum sequences S. Obviously, the coder can be adapted accordingly for each data sequence length $2^n$.

The data signal DS is branched off in apparatus 1.

The serially-received sequences of the spread data signals DS are then saved and transformed into parallel form. This e.g. can be achieved with a shift register or another serial-parallel converter. In the described embodiment, the eight chips are fed sequentially into shift registers 2, 4, 5, 7, which are switched forward in time after each sup-pulse duration $\tau$. The instants in which the chips were fed into the shift registers 2, 4, 5, 7 are indicated through the time designators t1 to t8. Two of the shift registers 5 and 7 are filled in reverse order, corresponding to the time reversal of step 104 of the invention's method. Since the chronological order of the chips is changed, the result is a reverse passing on. In an alternative embodiment, which is depicted in FIG. 3, only two shift registers 4 and 7 are used. The branching apparatus 1 then only branches the digitally spread data signal DS twice.

Two of the sequences of the data signals DS saved in 2, 4, 5, and 7 are transformed into complementary form by weighting the chips of the sequences alternately with +1 and −1, respectively. After the first sub-pulse duration $\Sigma$, e.g. after the first position of the shift register 2, 7, a second signal is derived and alternately weighted with + and −. Through the weighting of the received signal code with the simple sequence of alternating phase steps $B_i$=+, −, +, −, +, −, +, − (or digital values +1, −1 and so on or e.g. L, 0 and so on with QPSK) the corresponding weighted spread data signal DS' arises; for a data signal DS spread with a Golay- or Golay-Walsh sequence, the complementary data signal DS' results. Alternately, the weighting of the received signal code with the +/− sequence can also be accomplished in parallel circuitry as depicted in the embodiments of FIGS. 2 and 3.

As soon as the shift registers are filled, the chips are passed on in parallel. Two of the four saved sequences of the spread data signals DS, DS', one of the two sequences in weighted form, are being passed on in time-reversed order, such that signal sequences of time-reversed spread data signals result ($DS_{rev}$, $DS_{rev}$'). After that (corresponding to step 105 in FIG. 1) the signal sequences are correlated in correlation filters (KF1, KF2, KF3, KF4) with the corresponding saved spread spectrum sequence S(3,m), S $(3,m)_{Rev}$, S (3,m)', S $(3,m)_{Rev}$'.

The decoder can be designed such that, for each of the different spread spectrum sequences S of the multi-subscriber operation, a decoding circuit is provided according to FIG. 2 or 3 with the corresponding saved spread spectrum sequences. In a preferred embodiment, only one of the decoding circuits is used with a correlation circuit with a rewrite memory; the spread spectrum sequence for that specific subscriber can be fed into this memory, during the initialization of the communication process for example.

Eventually the sum over the four auto- or cross-correlations respectively, of the four parallel processed signal sequences is formed in the summation filter 8.

This can be accomplished with the filter part 8 depicted in FIGS. 2 and 3 in front of the devide's exit A, which is a simple addition. The autocorrelation signal is detected as a useful signal (with value 32 in the examples according to FIG. 5), which is distinctly different from the clearly smaller sidelobes (with value 16) and can be electronically processed easily.

The second embodiment of the invention's method, as well as their realization as an apparatus, will be explained in the following by means of FIGS. 8 to 13:

The second embodiment of the invention's method is based upon the first embodiment.

In de-coding, both the sums of the correlations of the spread data signals DS with saved Walsh sequences W(n,m) are formed, as well as after multiplication with the Golay-Walsh sequence AW(n,1); the correlations of the such resulting, converted spread data signals DAW(n,m) with saved Golay-Walsh sequences AW(n,m), AW(n,m)', $AW(n,m)_{rev}$, and $AW(n,m)_{rev}$', (refer to steps 106 and 111). After both sums are formed in step 106 and 111, they are correlated with an AND-operation;

$$({}_1\Sigma^4 KF_z){}^{\wedge}({}_5\Sigma^8 KF_z).$$

Figure 6:
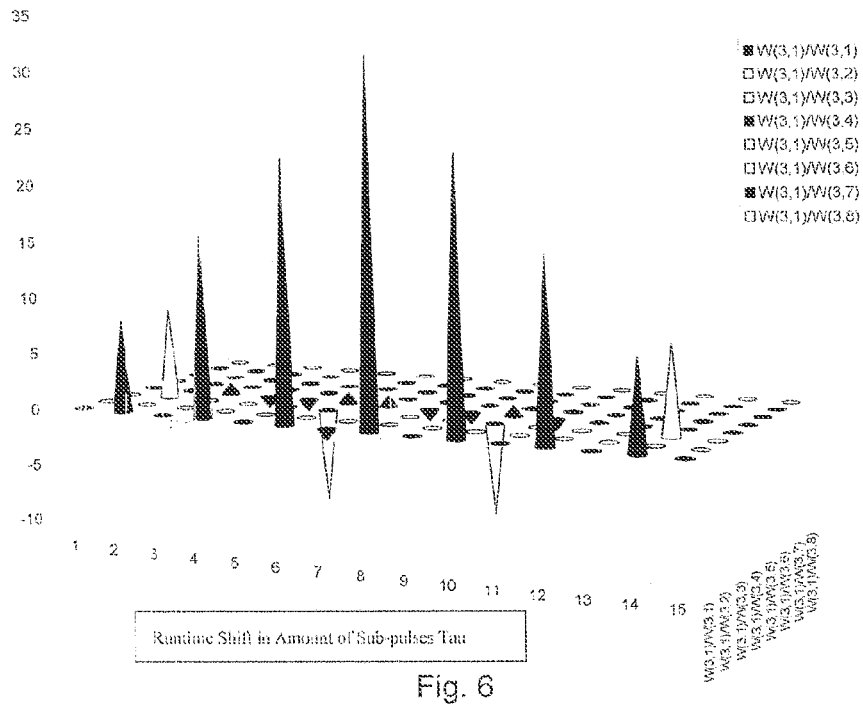
FIG. 6 depicts the correlation of Walsh sequences of order three in a diagram after the execution of the method's steps according to the first embodiment.

The result after performing the method steps 101 to 106 without the addition of the second embodiment demonstrate the examples of the first eight correlations in FIGS. 6 and 7.

For each value of the sidelobes of a KKF of the Walsh sequences, a value of zero corresponds to the correlation of the corresponding Golay-Walsh sequence with the exception of the main maximum AKF at $\tau=0$, which is fully preserved. Hence all sidelobes at all displacements $\tau>0$ are suppressed with the operation of the logical AND function, whereas the AKF shows the requested result: the ideal form of an unit pulse peak at $\tau=0$ for the detection of the useful signal, and simultaneously, all sidelobes are zero at all displacements $\tau>0$.

The three correlation pairs W(3,1)/W(3,3) (refer to FIG. 6), W(3,2)/W(3,4) and W(3,5)/W(3,7) of altogether 27 possibilities of cross-correlations show small sidelobes. The autocorrelation sums that are triangular in the original Walsh sequences and such are not suited for synchronization are certainly improved, however, they still contain high sidelobes next to the main signal peak. This is evident from FIG. 5. If a spread data signal AW(3,7) arrives according to the third row, then an exit value of 16 results in columns $t_6$ and $t_{10}$ an exit value of 16 results. This value, however, is suppressed through the AND-operation with the sum of the Walsh sequences, which has the value zero everywhere, as demonstrated in the following.

The Golay-Walsh sequences AW(n,m) generated in the receiver by multiplication have the following internal symmetry property that is used in the reception filter for the ideal pulse compression: by means of the addition above, the sum of the AKFs results in zero for all sidelobes as evident from FIG. 5 and depicted graphically in FIG. 7. Hence it holds true for the AND-operation of the AKF results of the rows W(3, 1)/W(3,1) with the results of the corresponding Golay-Walsh sequence AW(3,1)/AW(3,1) for the sums of the AKFs:

EXAMPLE 1

W(3,1)/W(3,1): 0,8,0,16,0,24,0,32,0,24,0,16,0,8,0
 Logically „AND"
AW(3,1)/AW(3,1): 0,0,0,0,0,0,0,32,0,0,0,0,0,0,0
 =0,0,0,0,0,0,0,32,0,0,0,0,0,0,0

The KKF between the data signals spread in the method steps 101 to 106 of the first embodiment still have four small values compared to the AKF, which in the case of the exemplary indicated values for the Golay-Walsh sequence with eight chips, also exists for three of the seven used Golay-Walsh sequences; in the case of AW(3,1) for AW(3,6), AW(3, 7) and AW(3,8), as evident from FIG. 6 and FIG. 7.

Through the second embodiment of the invention's method both the AKF as well as the KKF properties of the Walsh sequences are improved up to the absolute optimum because the AND-operation of the sums of the KKF of Walsh sequences with those of the Golay-Walsh sequences leads to the complete extinction of sidelobes as the two following examples illustrate:

EXAMPLE 2

W(3,1)/W(3,3): 0,8,0,0,0,−8,0,0,0,−8,0,0,0,8,0
 Logically „AND"
AW(3,1)/AW(3,3): 0,0,0,0,0,0,0,0,0,0,0,0,0,0,0
 =0,0,0,0,0,0,0,0,0,0,0,0,0,0,0

EXAMPLE 3

W(3,1)/W(3,7): 0,0,0,0,0,0,0,0,0,0,0,0,0,0,0
 Logically „AND"
AW(3,1)/AW(3,7): 0,0,0,0,16,0,0,0,16,0,0,0,0,0,0
 =0,0,0,0,0,0,0,0,0,0,0,0,0,0,0

This holds true for all other sums of the KKF, as evident from the two diagrams.

FIG. 13 summarizes the final results of the new method of AKF and KKF for the example of Walsh sequences W(3,m).

The comparison via an AND-operation in the receiver of the exit values from the correlation sums of the Walsh sequences according to the method's steps 101 to 106 with the threshold value from the correlation sums of the Golay-Walsh sequences thus delivers an absolutely pure pulse peak without sidelobes for the AKF. All KKFs also remain absolutely zero as shown in diagram FIG. 13.

The method is also applicable if instead of the Walsh sequences, the corresponding Golay-Walsh sequences are transmitted. In the first part of the method of steps 101 to 106, the Golay-Walsh sequences are correlated and added in the second part of the method. Then after the multiplication step, the corresponding Walsh sequences arise and their correlation steps by means of steps 107 to 111. There are several Golay sequences for every sequence length N, from which Golay-Walsh sequences can be generated (refer to e.g. M. J. E. Golay, Complementary Sequences, IRE Transactions on Information Theory, Bd. IT-7, S. 82-87, April 1961), which can also be taken as the basis for the new method.

The before-mentioned de-coder can be realized alternatively with digital signal processors (DSP). Another possibility of realization consists of applying the fast Fourier transformation DFFT and/or the fast Hadamard transformation in the de-coder. Analogously this holds true for an apparatus for transmitting digital signals that comprises a coder and de-coder, subject to the invention.

LIST OF REFERENCE DESIGNATORS

1 Branching device
2 Shift register
3 Multiplication filter
4 and 5 Shift register
6 Multiplication filter
7 Shift register
8 Summation filter
KF1 Correlation filter 1
KF2 Correlation filter 2
KF3 Correlation filter 3
KF4 Correlation filter 4
9 Shift register
10 Multiplication filter
11 Branching device
12 Shift register
13 Multiplication filter
14 and 15 Shift register
16 Multiplication filter
17 Shift register
18 Summation filter
KF5 Correlation filter 5
KF6 Correlation filter 6
KF7 Correlation filter 7
KF8 Correlation filter 8
AND-operation filter

The invention claimed is:

1. A method for despreading a spread data signal (DS), which has been spread by means of a spreading sequence (S), comprising the following steps:
 a) forming a time-reversed spread data signal (DSRev) from the spread data signal (DS);
 b) forming the complementary spread data signal (DS') from the spread data signal (DS), and forming the complementary time-reversed spread data signal (DSRev') from the time-reversed data signal through alternating multiplication of the chips of the sequence by +1 and −1;
 c) correlating the spread data signals (DS) with the spreading sequence (S), correlating the time-reversed spread data signal (DSRev) with the time-reversed spreading sequence (SRev), correlating the complementary spread data signal (DS') with the complementary spreading sequence (S'), and correlating the complementary time-reversed spread data signal (DSRev') with the complementary time-reversed spreading sequence (SRev'); and d) summing the four correlations from Step c).

2. The method for despreading according to claim 1, wherein the spreading sequence (S) is a Walsh function (W(n, m)).

3. The method for despreading according to claim 1, wherein the spreading sequence (S) is a representation of a pair of complementary Golay-Walsh sequences (AW(n,m), AW(n,m)'), which are generated through multiplication of one Golay sequence (A) of a pair of Golay sequences of base 2 (A, A') by a Walsh function (W(m,n)).

4. The method according to claim 3, wherein only one representation of a pair of complementary spread data signals (DS, DS') is transmitted from the transmitter to the receiver and the complementary spread data signals (DS', DSRev') are formed from the spread data signal (DS) or from the time-reversed spread data signal (DSRev).

5. The method according to claim 1, comprising the following further steps:
   e) forming a transformed spread data signal (DAW) through multiplication of the spread data signal (DS) by a Golay-Walsh sequence (AW(n,1));
   f) forming the time-reversed transformed spread data signal (DAWRev);
   g) forming the complementary transformed spread data signal (DAW') from the spread transformed data signal (DAW) and forming the complementary time reversed transformed spread data signal (DAWRev') from the time reversed transformed spread data signal (DAWRev) through alternating multiplication of the chip sequence by +1 and −1;
   h) correlating the transformed spread data signal (DAW) with a Golay-Walsh sequence (AW), correlating the time-reversed transformed spread data signal (DAWRev) with the time-reversed Golay-Walsh sequence (AWRev), correlating the complementary transformed spread data signal (DAW') with the complementary Golay-Walsh sequence (AW'), and correlating the complementary time-reversed transformed spread data signal DAWRev') with the complementary time-reverse Golay-Walsh sequence (AWRev');
   i) summing the four correlations from Step c); and
   j) combining the sums from Step d) and the sums from Step i) through conjunction.

6. The method according to claim 1, wherein the complementary spread data signal (DS') is formed prior to the time-reversed spread data signal (DSRev').

7. The method according to claim 1, wherein the alternating multiplication of the chips of the sequence by +1 and −1 of a sequence of the data signal (DS, DSRev) is effected through alternating multiplication of the chips of the sequence by +1 and −1.

8. The method according to claim 1, wherein the sequences (DS, S) have a length of 2n chips, where n is a integer ["natuerliche"] number.

9. The method according to claim 1, wherein the method steps are at least partially carried out in the frequency domain.

10. A decoder for the un-spreading of a spread data signal (DS), comprising:

means for splitting the spread data signal (DS);
means for storing at least two split spread data signals (DS);
means for forming and storing complementary spread data signals (DS') from the spread data signals (DS);
means for reading out stored spread data signals (DS, DS'), wherein either a spread data signal (DS) or a complementary spread data signal (DS') are read out as time-reversed spread data signals DSRev, DS Rev');
means (KF1, KR2, KF3, KF4) for correlating the spread data signal (DS) with the spreading sequence (S), for correlating the time-reversed spread data signal (DSRev) with the time-reversed spreading sequence (SRev), for correlating the complementary spread data signal (DS') with the complementary spreading sequence (S'), and for correlating the complementary time-reversed spread data signal (DSRev') with the complementary time-reversed spreading sequence (SRev'); and
means for summing the four correlations.

11. The decoder according to claim 10, wherein the data signal (DS) is spread by means of a Walsh function (W(n,m)).

12. The decoder according to claim 10, wherein the data signal (DS) is spread by means of a Golay-Walsh sequence (AW(n,m)), which are generated through multiplication of a Golay sequence (A) of a pair of Golay sequences of base 2 (A, A') by a Walsh function (W(m,n)).

13. The decoder according to claim 10, wherein the means for the formation of the complementary sequences are multiplication filters, which alternatingly multiply the individual chips of a sequence by +1 and −1.

14. A system for digital communication with spread modulation, which on the transmitter side comprises a coder for the spreading of data signals with spreading sequences (S) and on the receiver side comprises a decoder according to claim 10.

15. A device for the un-spreading of a spread data signal (DS), comprising:
   a branching apparatus configured to split the spread data signal (DS);
   one or more shift registers configured to store at least two split spread data signals (DS) received from the branching apparatus;
   one or more multiplication filters configured to form and store complementary spread data signals (DS') from the spread data signals (DS), and from which stored spread data signals (DS, DS') can be read out, wherein either a spread data signal (DS) or a complementary spread data signal (DS') can be read out as time-reversed spread data signals DSRev, DS Rev');
   correlation filters (KF1, KR2, KF3, KF4) configured to correlate the spread data signal (DS) with the spreading sequence (S), correlate the time-reversed spread data signal (DSRev) with the time-reversed spreading sequence (SRev), for correlate the complementary spread data signal (DS') with the complementary spreading sequence (S'), and correlate the complementary time-reversed spread data signal (DSRev') with the complementary time-reversed spreading sequence (SRev'); and
   a summation filter configured to sum the four correlations.

* * * * *